US012435630B2

(12) United States Patent
Beswick

(10) Patent No.: US 12,435,630 B2
(45) Date of Patent: Oct. 7, 2025

(54) METHOD AND APPARATUS FOR USE IN STOPE BACKFILL MINING

(71) Applicant: M2P ENGINEERING PTY LTD, Queensland (AU)

(72) Inventor: Adam Beswick, Queensland (AU)

(73) Assignee: M2P ENGINEERING PTY LTD, Queensland (AU)

( * ) Notice: Subject to any disclaimer, the term of this patent is extended or adjusted under 35 U.S.C. 154(b) by 187 days.

(21) Appl. No.: 18/243,743

(22) Filed: Sep. 8, 2023

(65) Prior Publication Data

US 2023/0417142 A1  Dec. 28, 2023

Related U.S. Application Data

(63) Continuation of application No. PCT/AU2022/050186, filed on Mar. 7, 2022.

(30) Foreign Application Priority Data

Mar. 8, 2021  (AU) ................. 2021900649

(51) Int. Cl.
*E21F 15/02* (2006.01)
(52) U.S. Cl.
CPC .................... *E21F 15/02* (2013.01)
(58) Field of Classification Search
CPC ................. E21F 15/02; E21F 15/04
See application file for complete search history.

(56) References Cited

U.S. PATENT DOCUMENTS

| 3,937,025 | A | * | 2/1976 | Alvarez-Calderon | ...................... E21C 41/16 405/289 |
| 5,469,920 | A | * | 11/1995 | Conti | ...................... A62C 3/02 169/48 |
| 10,774,644 | B2 | * | 9/2020 | Lamond | ................. E21F 15/08 |
| 2008/0190032 | A1 | | 8/2008 | Roelofs | |

(Continued)

FOREIGN PATENT DOCUMENTS

| CN | 105952451 A | 9/2016 |
| SU | 909223 A | 2/1982 |

OTHER PUBLICATIONS

International Search Report in corresponding International Patent Application No. PCT/AU2022/050186, mailed May 18, 2022, 3 pages.

(Continued)

*Primary Examiner* — Janine M Kreck
(74) *Attorney, Agent, or Firm* — McNees Wallace & Nurick LLC

(57) ABSTRACT

A method for forming a passage in stope backfill material includes steps of: a) providing an expandable void forming apparatus at a lower level relative to an unexcavated stope; b) expanding the void forming apparatus, such that a substantially liquid-impermeable seal is formed between the void forming apparatus and the unexcavated stope; c) pouring backfill material into a void formed by the excavation of a stope adjacent to the unexcavated stope, and allowing the backfill material to at least partially cure such that the void forming apparatus forms a passage between the unexcavated stope and the backfill material; and d) contracting the void forming apparatus and removing the void forming apparatus from the passage.

20 Claims, 5 Drawing Sheets

(56) References Cited

U.S. PATENT DOCUMENTS

| | | | | |
|---|---|---|---|---|
| 2010/0295359 | A1* | 11/2010 | Bodley | E21C 41/16 |
| | | | | 299/13 |
| 2014/0023444 | A1 | 1/2014 | Kingsley | |
| 2019/0032486 | A1 | 1/2019 | Lamond | |

OTHER PUBLICATIONS

Written Opinion of the International Searching Authority in corresponding International Patent Application No. PCT/AU2022/050186, mailed May 18, 2022, 8 pages.

\* cited by examiner

METHOD AND APPARATUS FOR USE IN STOPE BACKFILL MINING

CROSS-REFERENCE TO RELATED APPLICATIONS

This application is a Continuation of International Application No. PCT/AU2022/050186 filed Mar. 7, 2022, claiming priority from Australian Patent Application No. 2021900649 filed Mar. 8, 2021, both of which are incorporated herein by reference.

TECHNICAL FIELD

The present invention relates to a method and apparatus for use in stope backfill mining. In particular, the present invention relates to a method and apparatus for forming a slot void in backfill, and specifically during the backfill pouring sequence.

BACKGROUND

Stope mining is the process of extracting mineral ore in large blocks known as stopes from an underground mine, leaving behind a void from which the ore has been removed. The void must be backfilled to provide ground support and regional stability in order to allow for the excavation of nearby stopes.

Voids can be backfilled with a variety of materials, such as soil, overburden, mine tailings or imported aggregate. Backfill materials are typically poured into the void from above in the form of a slurry and are termed paste fill or hydraulic fill depending on their constituent materials and density. Typically, the backfill material cures in a manner similar to concrete.

In conventional operations, a bulkhead wall (usually made from rigid brattice sprayed with concrete) is installed at the bottom of the void to seal off an access drive before the backfill material is poured. Once the backfill is poured and cured, the bulkhead wall is destroyed and removed so that a void can be drilled or bored into the cured backfill to allow drill rigs to gain access to drill locations within the adjacent stope. This is a difficult, time-consuming and costly process.

Thus, there would be an advantage if it were possible to form a void in backfill material within a stope in a manner that was faster and more efficient than existing techniques.

It will be clearly understood that, if a prior art publication is referred to herein, this reference does not constitute an admission that the publication forms part of the common general knowledge in the art in Australia or in any other country.

SUMMARY OF INVENTION

The present invention is directed to a method and apparatus for use in stope backfill mining which may at least partially overcome at least one of the abovementioned disadvantages or provide the consumer with a useful or commercial choice.

With the foregoing in view, in a first aspect the present invention resides broadly in a method for forming a passage in stope backfill material, the method comprising the steps of:
 a) Providing an expandable void forming apparatus at a lower level relative to an unexcavated stope;
 b) Expanding the void forming apparatus, such that a substantially liquid-impermeable seal is formed between the void forming apparatus and the unexcavated stope;
 c) Pouring backfill material into a void formed by the excavation of a stope adjacent to the unexcavated stope, and allowing the backfill material to at least partially cure such that the void forming apparatus forms a passage between the unexcavated stope and the backfill material; and
 d) Contracting the void forming apparatus and removing the void forming apparatus from the passage.

In a second aspect, the present invention resides broadly in a method for forming a slot void in stope backfill material, the method comprising the steps of:
 a) Providing an expandable barrier member configured to extend upwardly from or adjacent a lower level relative to an unexcavated towards an upper level relative to the unexcavated stope,
 b) Expanding the barrier member, such that a substantially liquid-impermeable seal is formed between the barrier and the unexcavated stope;
 c) Pouring backfill material into a void formed by the excavation of a stope adjacent to the unexcavated stope, and allowing the backfill material to at least partially cure such that the barrier member forms a slot void between the unexcavated stope and the backfill material; and
 d) Contracting the barrier member and removing the barrier member from the slot void.

In a third aspect the present invention resides broadly in a method for forming a passage and a slot void in stope backfill material, the method comprising the steps of:
 a) Providing an expandable void forming apparatus at a lower level relative to an unexcavated stope and an expandable barrier member configured to extend upwardly from or adjacent to the void forming apparatus towards an upper level relative to the unexcavated stope;
 b) Expanding the void forming apparatus and the barrier member, such that a substantially liquid-impermeable seal is formed between the void forming apparatus and the barrier member and the unexcavated stope;
 c) Pouring backfill material into a void formed by the excavation of a stope adjacent to the unexcavated stope, and allowing the backfill material to at least partially cure such that the void forming apparatus forms a passage between the unexcavated stope and the backfill material and the barrier member forms a slot void passage between the unexcavated stope and the backfill material;
 d) Contracting the barrier member and removing the barrier member from the slot void; and
 e) Contracting the void forming apparatus and removing the void forming apparatus from the passage.

The expandable void forming apparatus may be of any suitable form. It is envisaged, however that the void forming apparatus may be expanded between a contracted condition and an expanded condition. It is envisaged that there may exist one or more intermediate expanded conditions between the contracted condition and the expanded condition. Thus, it is envisaged that the void forming apparatus may be configured to form voids of differing sizes depending on the degree to which the apparatus is expanded.

The void forming apparatus is located at a lower level relative to an unexcavated stope. Preferably, the void forming apparatus is located in a passage (such as a tunnel, drive or the like) located substantially beneath or adjacent the unexcavated stope. The void forming apparatus may be located in the passage using any suitable technique. For instance, the void forming apparatus may be pushed (or pulled) into the passage by a vehicle. Alternatively, the void forming apparatus may be self-propelled and may be driven into the passage by an operator. In other embodiments of the invention, an operator may use a remote control to locate the void forming apparatus within the passage. In yet further embodiments, the void forming apparatus may be an autonomous vehicle.

In some embodiments of the invention, the void forming apparatus may be provided with one or more movement members (such as wheels, rollers, skids, endless tracks or the like) that allow the void forming apparatus to be located within the passage. In an alternative embodiment, the void forming apparatus may be configured for movement along rails or tracks.

The void forming apparatus may be of any suitable size. However, it will be understood that the size of the void forming apparatus may vary depending on a number of factors, such as the length of the passage, the height of the passage, and so on. Thus, it is envisaged that the void forming apparatus may be fabricated in a plurality of different sizes. In an alternative embodiment, the void forming apparatus may be formed from one or more void forming modules configured for connection to one another. It is envisaged that two or more void forming modules may be located end on end such that the length of the void forming apparatus may be adjusted by adding or removing void forming modules.

The void forming modules within a void forming apparatus may be identical to one another, or there may be differences between the void forming modules. For instance, at least one of the void forming modules may be of a different size or shape to the other void forming modules if it is desired (or necessary) to form a void having a section of different size or shape to the remainder of the void.

The void forming apparatus may be expanded using any suitable technique. For instance, the void forming apparatus may be at least partially fabricated from one or more inflatable members. In this embodiment, it is envisaged that the one or more inflatable members may be inflated into the expanded condition prior to the pouring of the backfill material and deflated into the contracted condition once the backfill material has at least partially cured. The one or more inflatable members may be of any suitable type, although it is envisaged that the inflatable members may be fabricated from a flexible, substantially fluid-impermeable material. The inflatable members may be provided in the form of one or more inflatable bladders or balloons.

In one embodiment of the invention, the void forming apparatus may be rolled up for storage and/or transportation. In this embodiment of the invention, the void forming apparatus may be unrolled so as to lie substantially flat within the passage prior to inflation of the inflatable members. Alternatively, inflating fluid may be introduced to the void forming apparatus while it is rolled up, and the inflation of the inflatable members may result in the unrolling of the void forming apparatus. In this embodiment, it is envisaged that the void forming apparatus may be positioned adjacent to the entrance of the passage and may be inflated so that the void forming apparatus unrolls into the passage. In this way, it may be possible to reduce or eliminate the requirement for workers to enter the passageway.

The one or more inflatable members may be fabricated from any suitable material. However, in a preferred embodiment of the invention, the one or more inflatable members may be fabricated at least partially from a polymeric material. The polymeric material may be of any suitable form, although it is preferred that the polymeric material may be relatively burst-resistant, impact-resistant, abrasion-resistant, heat-resistant, chemical-resistant and so on. In a particular embodiment of the invention, the polymeric material may comprise polyvinyl chloride (PVC).

In some embodiments of the invention, the one or more inflatable members may be located within one or more outer layers of flexible material. In this embodiment, the one or more outer layers may be relatively burst-resistant, impact-resistant, abrasion-resistant, heat-resistant, chemical-resistant and so on and may protect the one or more inflatable members located therewithin from damage. In a preferred embodiment of the invention, the one or more outer layers may be fabricated at least partially from a polymeric material. In a particular embodiment of the invention, the polymeric material may comprise polyvinyl chloride (PVC).

The one or more inflatable members may be connected to the one or more outer layers using any suitable technique. Alternatively, the one or more inflatable members may be located within the one or more outer layers but may not be connected thereto.

The one or more outer layers of flexible material may be capable of expansion and contraction as the one or more inflatable members expand and contract. Alternatively, the one or more outer layers may be relatively inexpansible. Thus, in this embodiment, it is envisaged that the one or more inflatable members may expand and contract within the one or more relatively inexpansible outer layers. It is envisaged, therefore, that the size of the one or more outer layers may define the limit of expansion of the one or more inflatable members.

In some embodiments of the invention, one or more lifting members may be associated with the one or more outer layers. Preferably, the one or more lifting members may be associated with an outer surface of the one or more outer layers. The lifting members may be of any suitable form, although in a preferred embodiment of the invention the lifting members may be configured to allow the one or more outer layers to be lifted for transportation by a lifting device, such as a crane, forklift, helicopter, block and tackle, winch, hoist or the like. In some embodiments of the invention, the lifting members may comprise anchors, hooks, lugs or the like, or any suitable combination. The lifting members may be formed integrally with the outer layer or may be formed separately therefrom and configured for fixed or removable attachment thereto.

Preferably, the one or more outer layers at least partially surround the one or more inflatable members. For instance, the one or more outer layers may completely surround the one or more inflatable members such that the one or more inflatable members are entirely housed within the one or more outer layers. More preferably, however, the one or more outer layers partially surround the one or more inflatable members. In a specific embodiment of the invention, the one or more outer layers may surround all except a lower surface of the one or more inflatable members. Thus, the lower surface if the one or more inflatable members may be located in abutment with the ground surface within the passage.

In some embodiments of the invention, the void forming apparatus may include one or more skirt members. The one or more skirt members may be of any suitable form, although it is envisaged that the one or more skirt members may be configured to form a substantially liquid impermeable seal between a ground surface (such as a ground surface within the passage) and the void forming apparatus. In this way, the ingress of backfill material between the floor of the passage and the void forming apparatus may be reduced or eliminated.

The one or more skirt members may be of any suitable size, shape or configuration. Preferably, however, the one or more skirt members extend outwardly from a lower region of the void forming apparatus. Preferably, a lower surface of the one or more skirt members may be located in abutment with a ground surface within the passage.

The one or more skirt members may be formed separately to the void forming apparatus and may be configured for fixed or removable attachment thereto. More preferably, however, the one or more skirt members may be formed integrally with the void forming apparatus. More specifically, the one or more skirt members may be formed integrally with the one or more outer layers. In this embodiment of the invention, it is envisaged that the one or more skirt members may be fabricated from the same material as the remainder of the one or more outer layers.

The one or more skirt members preferably extend outwardly from a lower portion, such as a lower edge, of the one or more outer layers. In a preferred embodiment of the invention, it is envisaged that substantially the entire lower surface of the one or more skirt members may be located in abutment with the ground within the passage when in use. It will be understood, however, that environmental conditions (such as the presence of rocks and other debris) on the ground within the passage may prevent the lower surface of the one or more skirt members being located in complete abutment with the ground within the passage.

The one or more skirt members may be provided with one or more ground-engaging members (stakes, pegs or the like) to maintain the one or more skirt members in place against the ground surface within the passage. Alternatively, one or more weights may be associated with the skirt members (for instance, one or more weights may be located within the one or more skirt members) in order to reduce or eliminate movement of the skirt members relative to the ground surface during pouring of the backfill material. In other embodiments, the material from which the one or more skirt members is fabricated may be of sufficient weight and/or density to reduce or eliminate movement of the skirt members relative to the ground surface during pouring of the backfill material.

The one or more inflatable members may be inflated using any suitable inflating fluid. The inflating fluid may be a gas, a liquid or a combination thereof. For instance, the inflating fluid may be air or water. In other embodiments of the invention, the inflating fluid may be a relatively inert gas so as to reduce or eliminate fire or explosion risk in an underground mine environment.

In a preferred embodiment, the one or more inflatable members may be associated with a source of inflating fluid. The source of inflating fluid may be located at any suitable location relative to the void forming apparatus. For instance, a source of inflating fluid (such as a tank, cylinder or the like) may form part of the void forming apparatus. Alternatively, a source of inflating fluid may be located remote to the void forming apparatus, and the inflating fluid may be pumped or otherwise transferred to and from the one or more inflatable members. In a preferred embodiment of the invention, the source of the inflating fluid may be mine air (i.e. fresh air provided to underground mine workings).

The one or more inflatable members may be inflated to any suitable pressure. It will be understood that the pressure to which the one or more inflatable members are inflated may depend on a number of factors, such as the size and shape of the passage to be formed, the size and material construction of the inflatable members, the type of backfill material used and so on. Thus, it is envisaged that the one or more inflatable members may be inflated to any suitable pressure depending on the duty to which the inflatable members are being used.

It is envisaged that, in the expanded condition, the outer surface of the void forming apparatus may form a void forming surface. Preferably, the void forming surface is substantially sealed against the ingress of backfill material into the interior of the void forming apparatus.

The void forming surface may be of any suitable shape. For instance, the void forming surface may, in cross-section, be square, rectangular, arched and so on. It is envisaged that, in use, backfill material that is poured into the void will abut the void forming surface along at least a portion of the length of the void forming apparatus. Once the backfill material has at least partially cured, the void forming apparatus may be returned to the contracted condition leaving behind a void in the backfill material in the shape of the void forming surface.

Thus, it will be understood that the inflatable member may be of any suitable shape, but may preferably be shaped such that, in the expanded condition, the inflatable member forms the desired shape of the void forming surface.

In a preferred embodiment of the invention, the one or more inflatable members may be provided with one or more connection members. The one or more connection members may be of any suitable form, although it is envisaged that the one or more connection members may be configured to connect to the source of the inflating fluid. Thus, the one or more connection members may comprise one or more conduits (hoses, pipes or the like), fittings, valves or the like (or a combination thereof) through which the inflating fluid enters and/or exits the one or more inflatable members. Preferably, the one or more connection members are located in a rear portion of the one or more inflatable members (i.e. the end of the void forming apparatus furthest in use from the void formed by the excavation of a stope adjacent to the unexcavated stope).

In a preferred embodiment, the one or more outer layers may include one or more apertures therein through which the one or more connection members at least partially extend. In this way, the one or more inflatable members may be connected to the source of the inflating fluid while still being at least partially surrounded by the one or more outer layers.

The one or more outer layers may be of unitary construction or may be formed from two or more surface portions configured for fixed or removable connection to one another. It is envisaged that the surface portions may form walls of the outer layer. In some embodiments of the invention, the outer layer may be provided with at least one side wall and an upper wall. In a preferred embodiment of the invention, the outer layer may be provided with two pairs of opposed side walls and an upper wall. In some embodiments, the outer layer may be provided with a lower wall.

As previously stated, when the void forming apparatus is in the expanded condition, a substantially liquid-impermeable seal is formed between the void forming apparatus and the unexcavated stope. The liquid-impermeable seal may be formed using any suitable technique. For instance, a portion of the void forming surface may abut a surface of the unexcavated stope when in the expanded condition such that a seal is formed between the void forming surface and the unexcavated stope. In other embodiments the void forming apparatus may be provided with one or more sealing members. The one or more sealing members may be formed integrally with the void forming apparatus or may be formed separately therefrom and configured for fixed or removable connection therewith. Preferably, the sealing members are associated with an outer surface of the void forming apparatus. Preferably, the sealing members extend substantially about the void forming surface of the void forming apparatus along a portion of the length of the void forming apparatus. In some embodiments of the invention, two or more sealing members may be provided.

The sealing members may be fabricated of any suitable material. For instance, the sealing members may be fabricated from a polymeric material, and preferably a resiliently deformable polymeric material (such as a polymeric foam material). Alternatively, the sealing members may comprise inflatable members. In any case, it is envisaged that the sealing members may abut a surface of the unexcavated stope and form a seal therebetween. Thus, it is envisaged that the point of abutment between the sealing members and the unexcavated stope may define the limit of flow of the backfill material into the void formed by the excavation of an adjacent stope.

The barrier member may be of any suitable form. It is envisaged, however that the barrier member may be expanded between a contracted condition and an expanded condition. It is envisaged that there may exist one or more intermediate expanded conditions between the contracted condition and the expanded condition. Thus, it is envisaged that the barrier member may be configured to form slot voids of differing sizes depending on the degree to which the barrier member is expanded.

Preferably, the barrier member is substantially elongate in shape, such that the barrier member may be used to form elongate slot voids.

The barrier member may be expanded using any suitable technique. For instance, the barrier member may be at least partially fabricated from one or more inflatable members. In this embodiment, it is envisaged that the one or more inflatable members may be inflated into the expanded condition prior to the pouring of the backfill material and deflated into the contracted condition once the backfill material has at least partially cured. The one or more inflatable members may be of any suitable type, although it is envisaged that the inflatable members may be fabricated from a flexible, substantially fluid-impermeable material. The inflatable members may be provided in the form of one or more inflatable bladders or balloons. Preferably, the inflatable members are elongate members.

The one or more inflatable members may be fabricated from any suitable material. However, in a preferred embodiment of the invention, the one or more inflatable members may be fabricated at least partially from a polymeric material. The polymeric material may be of any suitable form, although it is preferred that the polymeric material may be relatively burst-resistant, impact-resistant, abrasion-resistant, heat-resistant, chemical-resistant and so on. In a specific embodiment of the invention, the one or more inflatable members may be fabricated from polyvinyl chloride (PVC).

In some embodiments of the invention, the one or more inflatable members may be located within one or more outer layers of flexible material. In this embodiment, the one or more outer layers may be relatively burst-resistant, impact-resistant, abrasion-resistant, heat-resistant, chemical-resistant and so on and may protect the one or more inflatable members located therewithin from damage. In a specific embodiment of the invention, the one or more outer layers may be fabricated from polyvinyl chloride (PVC). Preferably, the one or more outer layers are elongate members.

The one or more inflatable members may be inflated using any suitable inflating fluid. The inflating fluid may be a gas, a liquid or a combination thereof. For instance, the inflating fluid may be air or water. In other embodiments of the invention, the inflating fluid may be a relatively inert gas so as to reduce or eliminate fire or explosion risk in an underground mine environment.

In a preferred embodiment, the one or more inflatable members may be associated with a source of inflating fluid. The source of inflating fluid may be located at any suitable location relative to the barrier member. For instance, a source of inflating fluid (such as a tank, cylinder or the like) may form part of the barrier members. Alternatively, a source of inflating fluid may be located remote to the barrier member, and the inflating fluid may be pumped or otherwise transferred to and from the one or more inflatable members. In a preferred embodiment of the invention, the source of the inflating fluid may be mine air (i.e. fresh air provided to underground mine workings).

In embodiments of the invention in which the barrier member is used in conjunction with the void forming apparatus, the barrier member may be associated with the void forming apparatus such that the source of inflating fluid for the barrier member may be the same source of inflating fluid as for the void forming apparatus.

The barrier member may be associated with the void forming apparatus in any suitable manner. For instance, the barrier member may be formed integrally with the void forming apparatus or may be formed separately therefrom and configured for fixed attachment thereto. Preferably, however, the barrier member may be removably connected to the void forming apparatus in use, such that a single source of inflating fluid may be used to simultaneously expand the void forming apparatus and the barrier member.

In other embodiments of the invention, the barrier member may be connected to the void forming apparatus using any suitable technique or may simply abut the void forming apparatus during pouring of the backfill material. Preferably, the barrier member may also be suspended from above. Thus, the barrier member may be used independently of the void forming apparatus, or in the absence of the void forming apparatus.

In a preferred embodiment of the invention, the barrier member may be positioned in abutment with a substantially vertical edge of the unexcavated stope along at least a portion of the height of the edge of the unexcavated stope. More preferably, the barrier member may be positioned in abutment with a substantially vertical edge of the unexcavated stope along substantially the entire height of the edge of the unexcavated stope. In this way, backfill material may be substantially precluded from covering the vertical edge of the unexcavated stope, thereby reducing direct access to the vertical edge of the unexcavated stope.

The barrier member is configured to extend towards an upper level relative to the unexcavated stope. In a preferred embodiment, the barrier member may extend to at least the level of a passage (such as a tunnel, drive or the like) located substantially above or adjacent the unexcavated stope. By locating the void forming apparatus and the barrier member such that they together extend between a lower passage below the unexcavated stope and an upper passage above the unexcavated stope, it is ensured that the slot void that is formed by the barrier member is open at upper and lower ends thereof. This ensures that machinery (such as drilling rigs) can access the slot void from both above and below the unexcavated stope.

One the void forming apparatus and/or the barrier member are located in the desired position, backfill material is poured into avoid formed by the excavation of an adjacent stope. Although the backfill material may be of any suitable type, it is preferred that the backfill material may be paste.

The void into which the backfill material is poured may be filled in a single pour. Alternatively, the void may be filled incrementally in two or more pours of the backfill material. In this embodiment of the invention, it is envisaged that a first pour of backfill material may be allowed to at least partially cure before a second pour of backfill material is poured. Similarly, a second pour of backfill material may be allowed to at least partially cure before a third pour of backfill material is poured and so on.

In a specific embodiment, the void may be filled with backfill material in two pours. In a first pour of backfill material, it is envisaged that the backfill material may be poured to a level above the void forming apparatus (where present). The first pour of backfill material may be allowed to at least partially cure in order to provide support for the second pour of backfill material. In this embodiment of the invention, it is envisaged that the first pour of backfill material may cover at least a portion of the barrier member (where present).

It is envisaged that the second pour of backfill material may be completed when the level of backfill material in the void is substantially level with the upper passage above the unexcavated stope and, more specifically, with the floor level of the upper passage.

In some embodiments of the invention, the pouring of backfill material (and specifically, the rate of pouring of the backfill material) may be controlled in response to one or more measurements. Any suitable measurements may be used, although in a preferred embodiment of the invention, the one or more measurements may be associated with the barrier member. In particular, it is preferred that the flow of backfill material into the void may be controlled in response to measurements of the position of the barrier member, the pressure inside the barrier member and the like, or any suitable combination thereof.

Preferably, one or more sensors may be associated with the barrier member. The one or more sensors may measure any suitable parameters, such as the location of the barrier member in the void (i.e. whether the barrier member is moving, which would result in the formation of an uneven or misshapen slot void) the pressure in the barrier member (i.e. whether the barrier member is being compressed in such a manner that would result in the formation of an uneven or misshapen slot void) and so on.

In some embodiments of the invention, an operator may measure the parameters, or access measurements taken by the sensors, associated with the barrier member. The operator may then manually adjust the flow of backfill material into the void to ensure that the correct flow to ensure correct slot void formation is achieved.

In an alternative embodiment of the invention, the flow of backfill material into the void may be autonomously adjusted based on measurements taken by the one or more sensors. Thus, it is envisaged that the one or more sensors may be directly or indirectly in electronic communication with a valve controlling the flow of backfill material into the void.

Once the backfill material has at least partially cured (and preferably at least partially cured to the point where it is no longer capable of flowing), the barrier member and/or the void forming apparatus may be contracted into the contracted condition and then removed. The void forming apparatus may be removed in any suitable manner, although it is envisaged that the void forming apparatus may be removed in the opposite manner to that in which it entered the passage. The barrier member may be removed in any suitable manner, although in a preferred embodiment of the invention, the barrier member may be removed through an open upper end of the slot void.

In a fourth aspect, the invention resides broadly in a void forming apparatus for forming a void in stope backfill material, the apparatus comprising:

An inflatable member;

An outer layer at least partially surrounding the inflatable member; and

Wherein the inflatable member is inflatable between a contracted condition and an expanded condition in which the void forming apparatus forms a substantially continuous void forming surface.

In some embodiments of the invention, the void forming apparatus may be provided with one or more movement members. The movement members may be of any suitable form, although it is envisaged that the movement members may be configured to allow movement of the void forming apparatus relative to a ground surface. Thus, the movement members may comprise one or more wheels, rollers, skids, endless tracks or the like, or any suitable combination thereof.

As previously stated, in the expanded condition the void forming apparatus forms a substantially continuous void forming surface. The void forming surface may be of any suitable shape, although it is envisaged that the void forming surface may have a shape that is the desired shape of the passage that it forms. Thus, the void forming surface may be in the shape of an arch, a square arch and so on.

Preferably, as the void forming apparatus inflates to form the void forming surface, the void forming apparatus forms a seal against the unexcavated scope so as to reduce or eliminate the flow of backfill material between the void forming apparatus and the unexcavated stope. In some embodiments of the invention, the void forming apparatus may further comprise one or more sealing members configured to form a seal against the unexcavated scope.

The one or more sealing members may be formed integrally with the void forming apparatus or may be formed separately therefrom and configured for fixed or removable connection therewith. Preferably, the sealing members are associated with an outer surface of the void forming apparatus. Preferably, the sealing members extend substantially about the void forming surface of the void forming apparatus along a portion of the length of the void forming apparatus. In some embodiments of the invention, two or more sealing members may be provided.

The sealing members may be fabricated of any suitable material. For instance, the sealing members may be fabricated from a polymeric material, and preferably a resiliently deformable polymeric material (such as a polymeric foam material). Alternatively, the sealing members may comprise inflatable members. In any case, it is envisaged that the sealing members may abut a surface of the unexcavated stope and form a seal therebetween. Thus, it is envisaged that the point of abutment between the sealing members and the unexcavated stope may define the limit of flow of the backfill material into the void formed by the excavation of an adjacent stope.

In a fifth aspect, the invention resides broadly in a barrier member for forming a slot void in stope backfill material, the barrier member comprising:

An elongate inflatable member;

An elongate outer layer at least partially surrounding the elongate inflatable member; and Wherein the inflatable member is inflatable between a contracted condition and an expanded condition in which the barrier member forms a substantially continuous elongate slot void forming surface.

The barrier member may be of any suitable shape in the expanded condition. However, in a preferred embodiment of the invention, the barrier member may be substantially cylindrical in shape in the expanded condition. The cross-sectional shape of the barrier member in the expanded condition may be substantially circular, although it will be understood that this need not be the case, and the cross-sectional shape may be oval, elliptical and so on. It will also be understood that the cross-sectional shape of the barrier member need not be a regular shape.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows.

DETAILED DESCRIPTION

Figure 1:
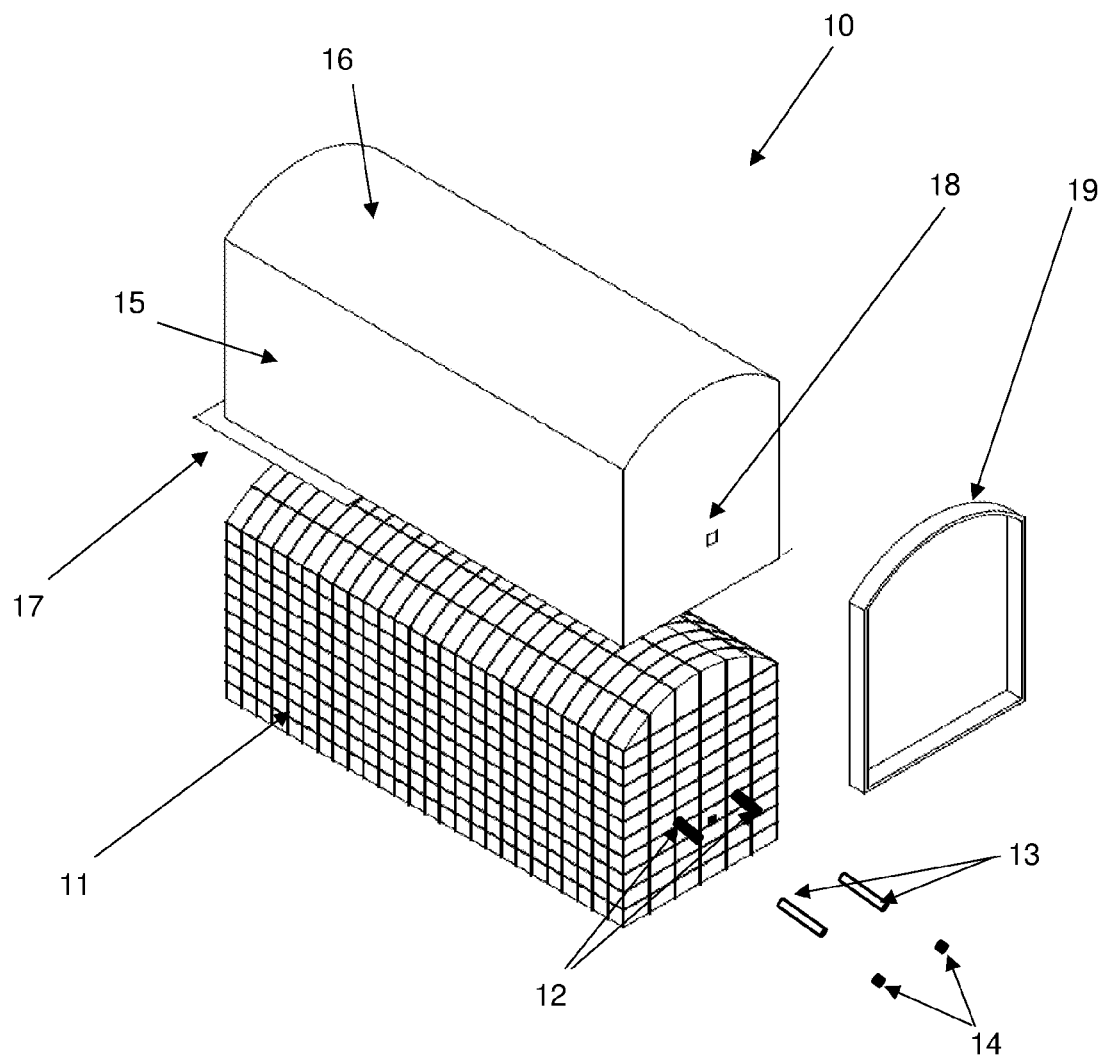
FIG. 1 illustrates an exploded view of a void forming apparatus according to an embodiment of the present invention.

FIG. 1 illustrates an exploded view of a void forming apparatus 10 according to an embodiment of the present invention. The void forming apparatus 10 comprises an inflatable member 11 that is inflatable between a contracted condition and the expanded condition shown in FIG. 1. The inflatable member 11 includes a pair of connection members 12 through which inflating fluid enters and exist the inflatable member 11 so as to inflate and deflate the inflatable member 11. The connection members 12 are associated with conduits 13 that are used to interconnect the connection members 12 with hoses or the like associated with the source of the inflating fluid. Pressure relief valves 14 are associated with the connection members in order to prevent overinflation of the inflatable member 11.

The void forming apparatus further comprises an outer layer 15 that, in use, houses the inflatable member 11 therewithin. The outer layer 15 is of approximately the same size and shape as the inflatable member 11 when the inflatable member is in the expanded condition. In this way, the material of the outer layer 15 may be stretched relatively taut by the expanded inflatable member 11 so as to create a relatively uniform seal between the void forming apparatus 10 and the surface of the unexcavated stope (not shown) in which the apparatus 10 is used.

The outer layer 15 is formed from a plurality of surface portions such that the outer layer 15 comprises two pairs of side walls and an upper surface 16. In use, the outer layer 15 forms the void forming surface, and the passage formed within the backfill material will have substantially the same shape and size as the outer layer 15. In the embodiment of the invention shown in FIG. 2, the upper surface 16 is curved such that the passage formed within the backfill material will have an arched shape.

The outer layer 15 further comprises a skirt member 17 that extends outwardly from a lower region of the outer layer 15. The skirt member 17 is positioned at approximately 90° to the side walls of the outer layer 15 and is configured to be located in abutment with a ground surface in in the passageway in which the void forming apparatus 10 is to be used. By locating the skirt member 17 in abutment with the ground surface, the flow of backfill material between the ground surface and the skirt member 17 may be reduced or eliminated.

The skirt member 17 extends only partway about the periphery of the outer layer 15, and it is envisaged that the skirt member 17 will be located at the end of the apparatus 10 closest to the point at which backfill material enters the void formed by the excavation of an adjacent stope.

The outer layer 15 is provided with a plurality of apertures 18 therein. In use, the connection members 12 and/or the conduits 13 pass at least partially through the apertures 18 to allow connection to the source of the inflating fluid while still ensuring that the inflatable member 11 remains housed within the outer layer 15.

The void forming apparatus 10 further comprises a sealing member 19 in the form of a ring that surrounds the apparatus 10 and extends along a portion of the length of the apparatus 10. The sealing member 19 of FIG. 1 is fabricated from a foamed polymeric material such that, in use, the sealing member forms a seal against the surface of the unexcavated stope (not shown) in which the apparatus 10 is used.

Figure 2:
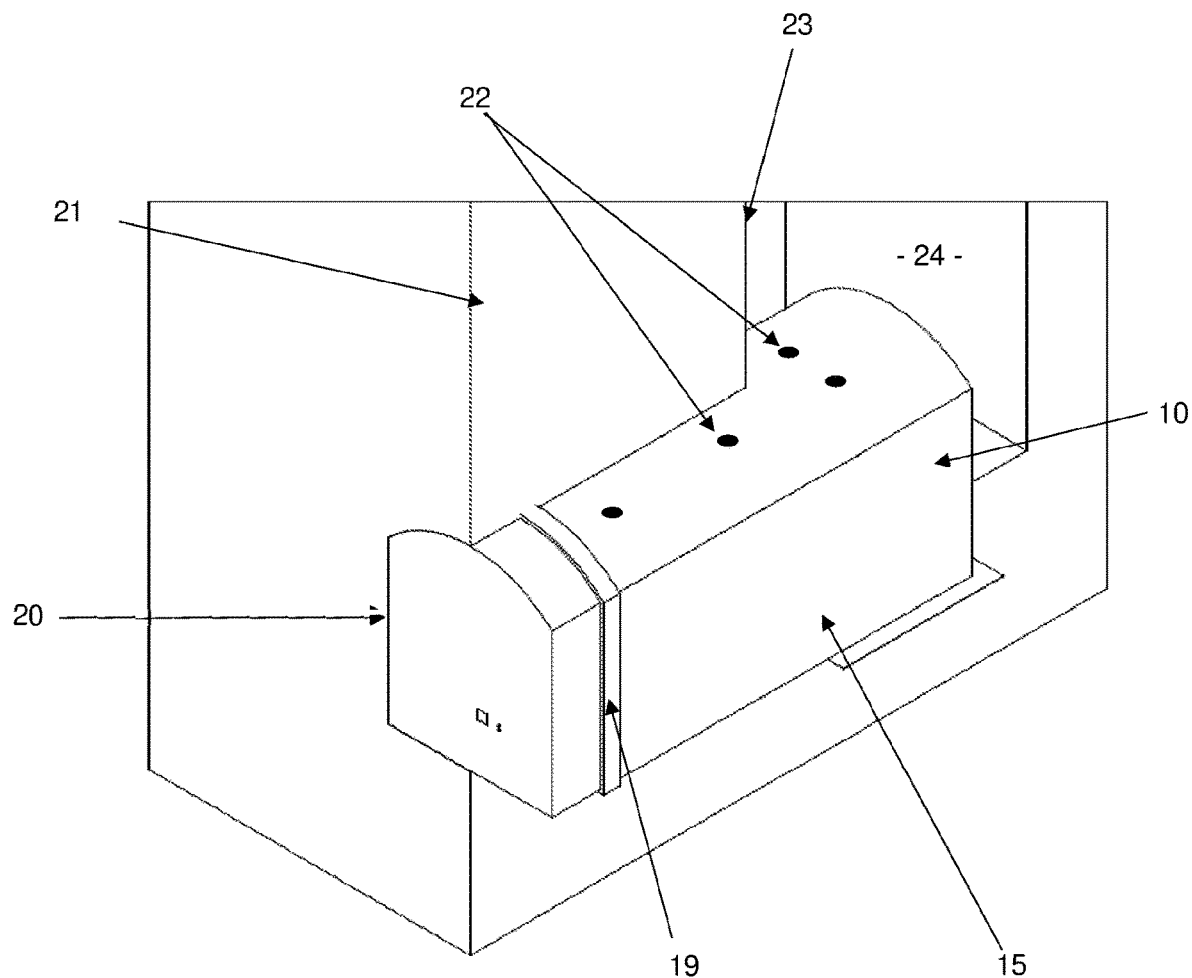
FIGS. 2-5 illustrate steps in method for forming a passage and/or slot void in stope backfill material according to various embodiments of the present invention.

In FIG. 2, the void forming apparatus 10 is shown in use. The apparatus 10 is positioned within a passageway 20 formed beneath an unexcavated stope 21. The apparatus 10 is shown in the expanded condition in which the outer layer 15 and/or the sealing member 19 form a substantially liquid-impermeable seal against the unexcavated stope 21. Thus, it is envisaged that the flow of backfill material between the outer layer 15 and/or the sealing member 19 may be reduced or eliminated.

In FIG. 2, it may also be seen that the upper surface 16 of the outer layer is provided with a plurality of lifting members 22 to facilitate lifting of the apparatus 10 for transportation or to be placed into storage.

When positioning the apparatus within the passageway 20, a portion of the apparatus 10 extends beyond the edge 23 of the unexcavated stope 21 and into a void 24 formed by the excavation of an adjacent stope. Once the apparatus 10 is in place, backfill material (not shown) may be poured into the void 24.

Figure 3:
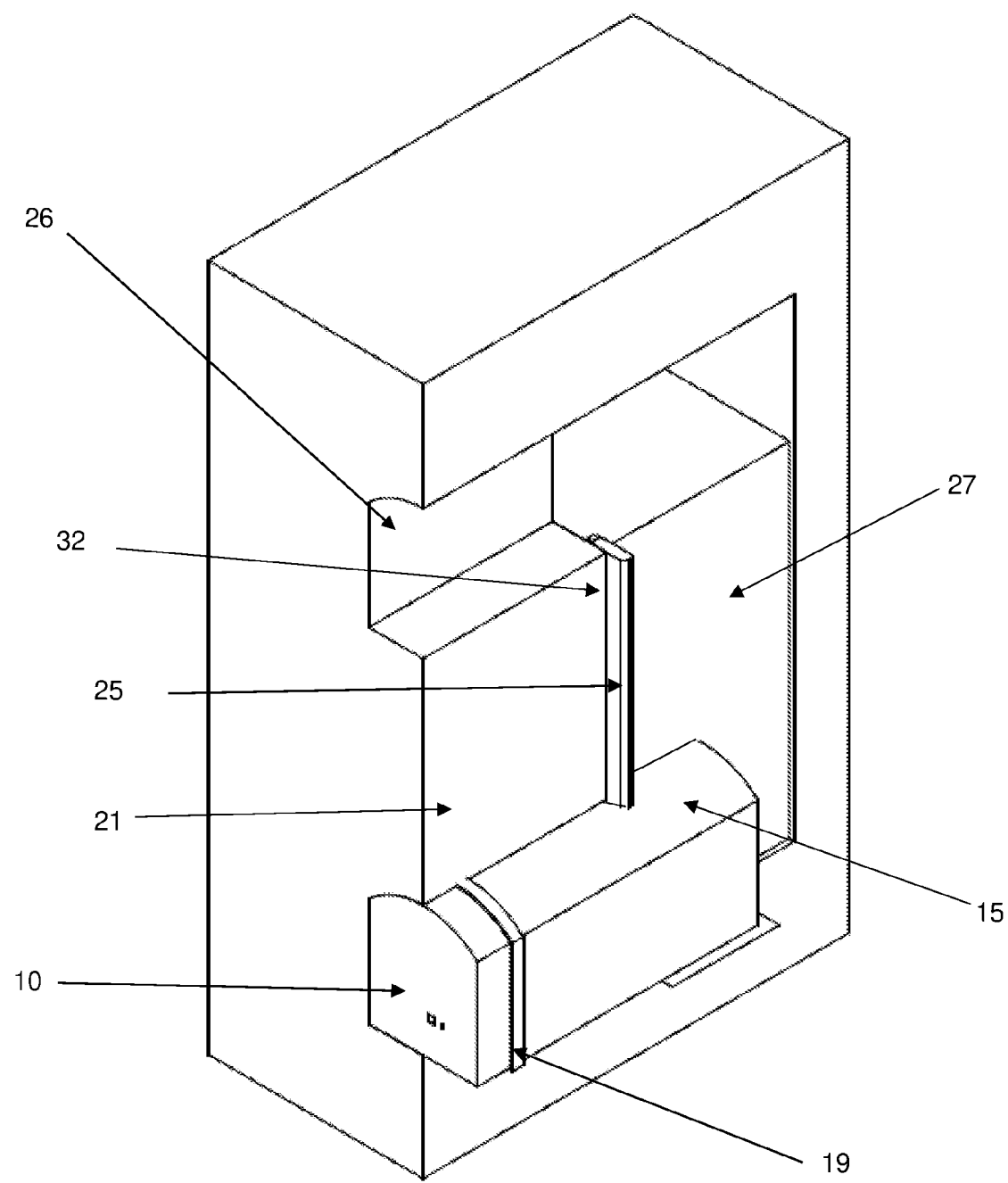

In FIG. 3, an inflatable barrier member 25 extends upwardly from the void forming apparatus 10 to an upper passageway 26 above the unexcavated stope 21. The inflatable barrier member is positioned against a vertical edge 32 of the unexcavated stope 21. Both the void forming apparatus 10 and the inflatable barrier member 25 of FIG. 3 are shown in their expanded conditions.

Backfill material 27 is poured into the void adjacent the unexcavated stope 21 from the upper passageway 26. The backfill material 27 flows partially about the barrier member 25 and along the void forming surface (formed by the outer layer 15 of the void forming apparatus 10). While it is envisaged that the seal formed between the outer layer 15 and the unexcavated stope 21 may be sufficient to substantially prevent backfill material 27 from passing therebetween, it is envisaged that, in any event, backfill material 27 may pass between the outer layer 15 and the unexcavated stope 21 only as far as the sealing member 19. The backfill material 27 is poured into the void until the level of the backfill material 27 in the void reaches the floor level of the upper passageway 26. The backfill material is then allowed to at least partially cure.

Figure 4:
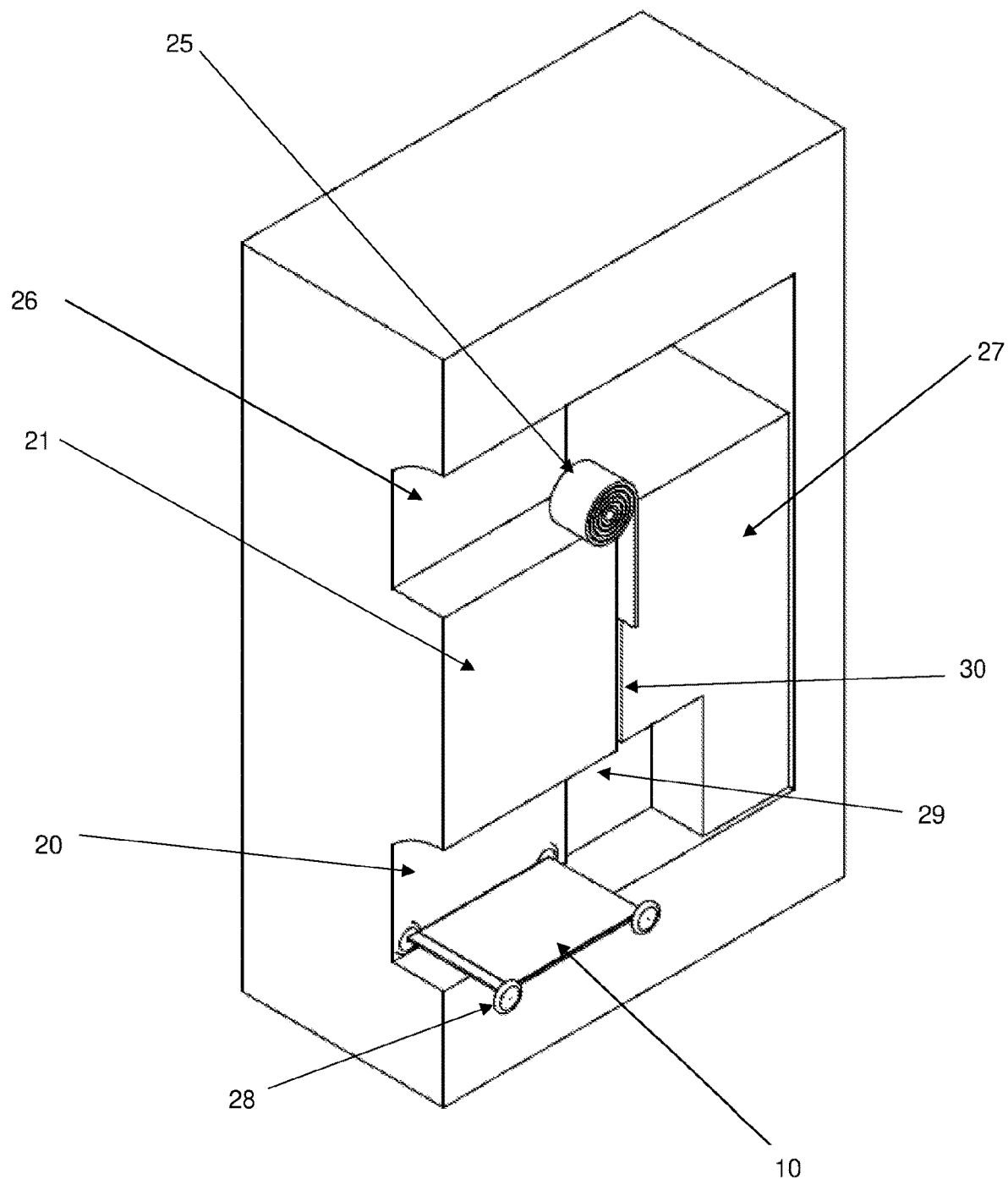

Once the backfill material 21 has at least partially cured, the void forming apparatus 10 and the barrier member 25 are removed as shown in FIG. 4. The barrier member 25 is deflated and then removed via the upper passageway 26. The void forming apparatus 10 is moved from the expanded condition to the retracted condition so that it can be removed from the passageway 20. In FIG. 4, the void forming apparatus 10 is mounted on wheels 28, so that the void forming apparatus 10 may be wheeled out of the passageway 20.

Removal of the void forming apparatus 10 leaves a passage 29 formed in the cured backfill material 27 that joins the passageway 20 beneath the unexcavated stope 21, while removal of the barrier member 25 leaves a substantially vertical slot void 30 between the backfill material 27 and the unexcavated stope 21 that extends between the lower passageway 20 and the upper passageway 26.

Figure 5:
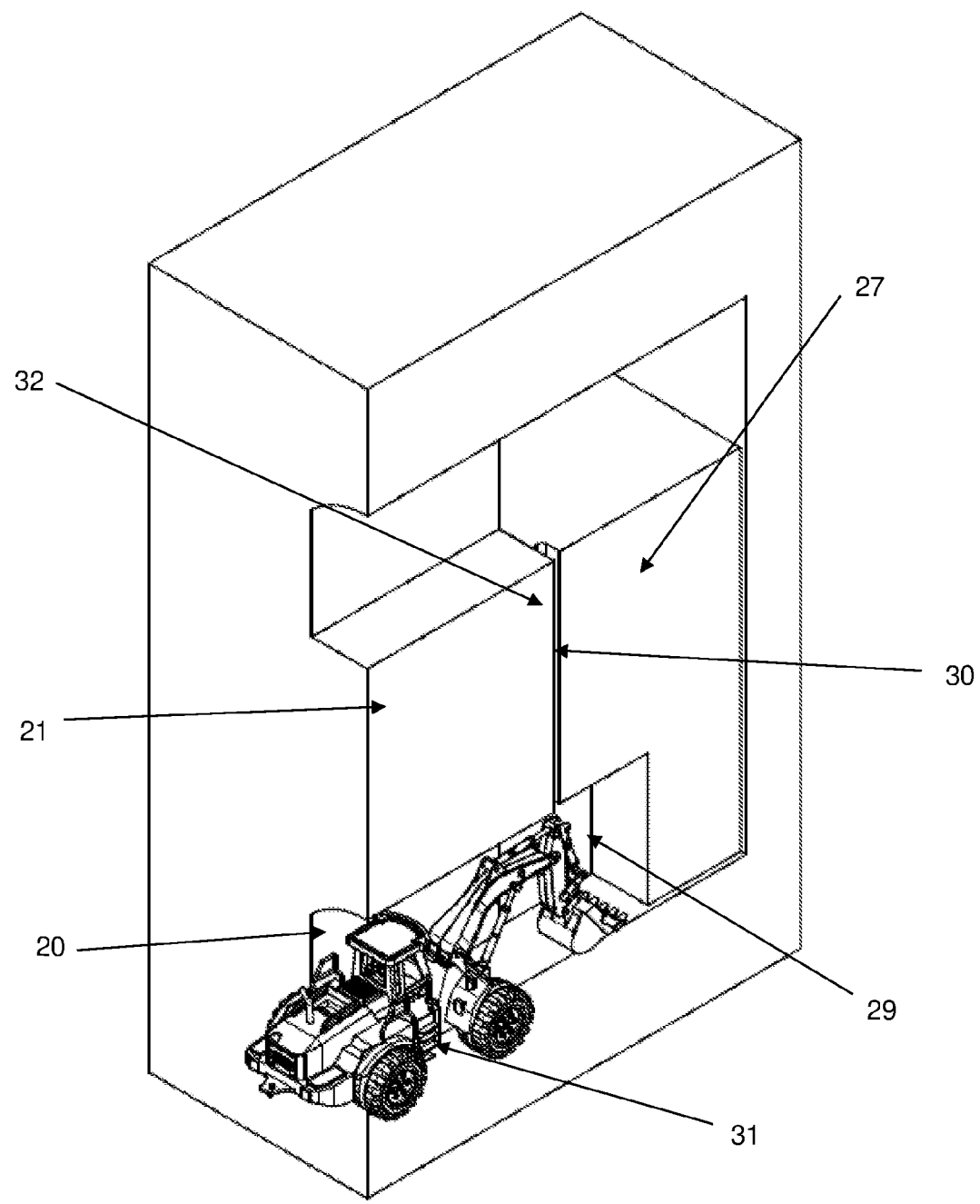

In FIG. 5, mining of the unexcavated stope 21 can now begin. A drilling machine 31 enters the lower passageway 20 and can immediately begin to drill boreholes into the unexcavated stope 21 along the vertical edge 32 thereof via the slot void 30 without needing to first drill or mine a slot void from the backfill material 27.

The passage 29 (which in this Figure extends partially beneath the unexcavated stope 21) formed by the void forming apparatus (not shown in this Figure) also provides a stable roof over the drilling machine 31 as it forms drillholes in the unexcavated stope 21.

By eliminating the requirement to drill or mine the cured backfill material to create a passage and/or void slot in the backfill material, the present invention allows drilling or mining of the unexcavated scope to begin as soon as the backfill material has cured to a sufficient degree. Not only does this reduce the time taken to ready the unexcavated stope for mining (thereby reducing production downtime), but it also reduces the quantity (and therefore cost) of backfill material required to fill the void. In addition, the present invention reduces equipment wear and associated maintenance costs by reducing or eliminating the requirement to drill or mine a passage and/or slot void in the backfill material. Finally, the present invention reduces or eliminates the possibility of damage to equipment or injury to workers when drilling or mining backfill material to form a passage and/or slot void therein.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A method for use in stope backfill mining, the method comprising:
    providing an expandable void forming apparatus at a lower level relative to an unexcavated stope, wherein a portion of the expandable void forming apparatus extends beyond an edge of the unexcavated stope and into a void formed by excavation of an adjacent stope;
    providing an expandable barrier member configured to extend upwardly from the expandable void forming apparatus from or adjacent a lower level relative to an unexcavated towards an upper level relative to the unexcavated stope;
    expanding the void forming apparatus, such that a substantially liquid-impermeable seal is formed between the void forming apparatus and the unexcavated stope;
    expanding the barrier member such that a substantially liquid-impermeable seal is formed between the barrier member and the unexcavated stope;
    pouring backfill material into the void, and allowing the backfill material to at least partially cure such that i) the void forming apparatus forms a passage between the unexcavated stope and the backfill material, and ii) the barrier member forms a slot void between the unexcavated stope and the backfill material;
    contracting the barrier member and removing the barrier member from the slot void; and
    contracting the void forming apparatus and removing the void forming apparatus from the passage.

2. The method according to claim 1, wherein the void forming apparatus is expandable between a contracted condition and an expanded condition.

3. The method according to claim 1, wherein the void forming apparatus is located in a passage located substantially beneath or adjacent the unexcavated stope.

4. The method according to claim 1, wherein the void forming apparatus is formed from one or more void forming modules configured for connection to one another.

5. The method according to claim 1, wherein the void forming apparatus is at least partially fabricated from one or more inflatable members.

6. The method according to claim 5, wherein the one or more inflatable members are provided in a form of one or more inflatable bladders or balloons.

7. The method according to claim 5, wherein the one or more inflatable members are located within one or more outer layers of flexible material.

8. The method according to claim 5, wherein the one or more inflatable members are associated with a source of inflating fluid.

9. The method according to claim 8, wherein the inflating fluid comprises a relatively inert gas.

10. The method according to claim 1, wherein the void forming apparatus comprises one or more skirt members configured to form a substantially liquid impermeable seal between a ground surface and the void forming apparatus.

11. The method according to claim 1, wherein the expandable barrier member is substantially elongate in shape.

12. The method according to claim 1, wherein the barrier member is fabricated from one or more elongate inflatable members.

13. The method according to claim 12, wherein the one or more elongate inflatable members are located within one or more outer layers of flexible material.

14. The method according to claim 1, wherein the barrier member is positioned in abutment with a substantially vertical edge of the unexcavated slope along at least a portion of the height of the substantially vertical edge of the unexcavated stope.

15. The method according to claim 1, wherein the barrier member extends to at least a level of a passage located substantially above or adjacent the unexcavated stope.

16. The method according to claim 1, wherein one or more sensors are associated with the barrier member, the one or more sensors being configured to measure the location of the barrier member within the void and/or the pressure in the barrier member.

17. A system for use in stope backfill mining, the apparatus comprising:
a void forming apparatus including:
an inflatable member;
an outer layer at least partially surrounding the inflatable member,
wherein the inflatable member is inflatable between a contracted condition and an expanded condition in which the void forming apparatus forms a substantially continuous void forming surface; and
a barrier member including:
an elongate inflatable member; and
an elongate outer layer at least partially surrounding the elongate inflatable member,
wherein the elongate inflatable member is inflatable between a contracted condition and an expanded condition in which the barrier member forms a substantially continuous elongate slot void forming surface.

18. The system according to claim 17, wherein the inflatable member and the outer layer are at least partially fabricated from PVC.

19. The system according to claim 17, wherein the elongate inflatable member and the outer layer are at least partially fabricated from PVC.

20. The system according to claim 17, wherein the void forming apparatus comprises one or more skirt members extending outwardly from a lower region of the void forming apparatus, wherein the one or more skirt members are configured to form a substantially liquid impermeable seal between a ground surface and the void forming apparatus.

* * * * *